United States Patent
Hatano et al.

(10) Patent No.: US 8,323,845 B2
(45) Date of Patent: Dec. 4, 2012

(54) SOLID OXIDE ELECTROLYTE FUEL CELL PLATE STRUCTURE, STACK AND ELECTRICAL POWER GENERATION UNIT

(75) Inventors: Masaharu Hatano, Kanagawa-ken (JP); Mitsugu Yamanaka, Kanagawa-ken (JP); Fuminori Satou, Kanagawa-ken (JP); Itaru Shibata, Kanagawa-ken (JP); Keiko Kushibiki, Kanagawa-ken (JP); Naoki Hara, Kanagawa-ken (JP); Tatsuhiro Fukuzawa, Kanagawa-ken (JP); Makoto Uchiyama, Kanagawa-ken (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 1490 days.

(21) Appl. No.: 11/495,752

(22) Filed: Jul. 31, 2006

(65) Prior Publication Data

US 2006/0269822 A1    Nov. 30, 2006

Related U.S. Application Data

(62) Division of application No. 10/114,076, filed on Apr. 3, 2002, now Pat. No. 7,122,268.

(30) Foreign Application Priority Data

Apr. 23, 2001    (JP) .................... 2001-123990

(51) Int. Cl.
*H01M 8/10* (2006.01)
*H01M 2/18* (2006.01)
*H01M 2/08* (2006.01)
(52) U.S. Cl. .................. 429/454; 429/480; 429/508
(58) Field of Classification Search .......... 429/34, 429/35, 36, 37, 38, 39
See application file for complete search history.

(56) References Cited

U.S. PATENT DOCUMENTS

| | | | |
|---|---|---|---|
| 4,476,196 A | 10/1984 | Poeppel et al. | |
| 4,522,895 A * | 6/1985 | Shigeta et al. | 429/44 |
| 5,912,088 A | 6/1999 | Ernst | |
| 6,258,475 B1 * | 7/2001 | Sugita et al. | 429/470 |
| 6,261,711 B1 | 7/2001 | Matlock et al. | |
| 6,303,245 B1 | 10/2001 | Nelson | |
| 2002/0110720 A1 * | 8/2002 | Yang | 429/35 |

FOREIGN PATENT DOCUMENTS

| | | |
|---|---|---|
| JP | 60-100377 A | 6/1985 |
| JP | 2-060062 A | 2/1990 |
| JP | 3-055764 A | 3/1991 |
| JP | 4-036962 A | 2/1992 |
| JP | 5-36417 A | 2/1993 |
| JP | 6-060888 A | 3/1994 |
| JP | 7-094196 A | 4/1995 |
| JP | 7-312223 A | 11/1995 |

* cited by examiner

*Primary Examiner* — Barbara Gilliam
*Assistant Examiner* — Stephan Essex
(74) *Attorney, Agent, or Firm* — Foley & Lardner LLP (57) ABSTRACT

A solid electrolyte fuel cell plate structure includes a cell element layer composed of a solid electrolyte, an air electrode layer and a fuel electrode layer, a porous base body supporting the cell element layer, and a gas-impermeable member having electric conductivity. The cell element layer is arranged such that the solid electrolyte layer is sandwiched between the air electrode layer and the fuel electrode layer, with the air electrode layer or the fuel electrode layer being joined to the porous base body. The gas-impermeable member is associated with the solid electrolyte layer to allow gas internally passing through the porous base body to be separated from gas flowing outside the porous base body. Such a cell plate structure can be employed in a solid electrolyte fuel cell stack, which in turn can be employed in a solid electrolyte fuel cell electric power generation unit.

6 Claims, 7 Drawing Sheets

SOLID OXIDE ELECTROLYTE FUEL CELL PLATE STRUCTURE, STACK AND ELECTRICAL POWER GENERATION UNIT

The present application is a divisional of U.S. application Ser. No. 10/114,076, filed Apr. 3, 2002, now U.S. Pat. No. 7,122,268, the entire contents of which is incorporated herein by reference.

BACKGROUND OF THE INVENTION

The present invention relates to a solid oxide electrolyte fuel cell plate structure, a stack and an electrical power generation unit and, more particularly, to a cell plate structure to be employed in a solid oxide electrolyte fuel cell, a stack to which such a cell plate structure is applied, and an electric power generation unit provided with such a stack.

The solid oxide electrolyte fuel cell (hereinafter referred to as SOFC) is widely grouped into a plate type fuel cell and a cylindrical type fuel cell. The former has an increased electric density but has a tendency wherein a difficulty is encountered in lamination of the plates in multiple layers and in the provision of a large capacity power output. In contrast, although the latter has a high gas shielding property, the latter has an increased internal resistance and, so, there is a tendency to have a difficulty in increasing an electric power generating density.

Japanese Patent Application Laid-Open Publication NO. H5-36417 discloses the SOFC of a hollow thin plate type which includes a hollow base body composed of electrode material, cell elements composed of electrode/electrolyte/electrode structure, interconnectors for providing electrical connection between the cell elements and a gas-impermeable layer composed of alumina.

SUMMARY OF THE INVENTION

However, such a hollow thin wall type SOFC has a base body formed in a hollow shape and encounters not only a series of complicated manufacturing steps but also an increased tendency of internal stress to occur. Thus, there is still room for study of such SOFC from the view point of simplification of manufacturing steps as well as improvements in a mechanical strength.

Further, the presence of the gas-impermeable member made of ceramics (alumina) still requires a room for further study from the point of improvement in a gas-impermeable property. Furthermore, since such a gas-impermeable member is made of an insulating material, during a laminating process, there is a need for separately preparing interconnectors made of electrically conductive material.

The present invention has been made with the above view in mind and has an object to provide a SOFC cell plate structure which has both a high gas-shielding effect and a high electric power generating density and which is easy to manufacture and low in manufacturing cost, a stack employing such a cell plate structure, an electric power generating unit utilizing such a stack, and a method of manufacturing such a cell plate structure.

Upon considerable research and development work undertaken by the inventors of the present invention with a view to achieving the above object, it is founded that the use of a suitable combination of a base body formed in a particular structure and a gas-impermeable member having an electric conductivity is effective for achieving the above object, and thus the present invention has been completed in a success.

According to one aspect of the present invention, there is provided a cell plate structure for a solid electrolyte fuel cell, comprising: a cell element layer having an air electrode layer, a fuel electrode layer and a solid electrolyte layer sandwiched between the air electrode layer and the fuel electrode layer; a porous base body supporting the cell element layer such that the cell element layer allows the air electrode layer or the fuel electrode layer to be formed on the porous base body to be joined thereto; and a gas-impermeable member having an electrical conductivity. The gas-impermeable member is associated with the solid electrolyte layer to allow gas flowing through the porous base body to be separate from gas flowing outside the porous base body.

According to another aspect of the present invention, there is provided a solid electrolyte fuel cell stack comprising: a solid electrolyte fuel cell plate structure; and a porous base body disposed adjacent to the solid electrolyte fuel cell plate structure. The solid electrolyte fuel cell plate structure includes: a cell element layer having an air electrode layer, a fuel electrode layer and a solid electrolyte layer which is sandwiched between the air electrode layer and the fuel electrode layer; a porous base body supporting the cell element layer, the cell element layer being formed on the porous base body such that the air electrode layer or the fuel electrode layer is formed on the porous base body to be joined thereto; and a gas-impermeable member having an electrical conductivity and associated with the solid electrolyte layer to allow gas flowing through the porous base body to be separate from gas flowing outside the porous base body. A plurality of the solid electrolyte fuel cell plate structures are stacked via the porous base body, adjacent to the fuel cell plate structures, in a direction in which the cell element layers are laminated.

According to another aspect of the present invention, there is provided a solid electrolyte fuel cell stack comprising a solid electrolyte fuel cell plate structure. The solid electrolyte fuel cell plate structure comprises: a cell element layer having an air electrode layer, a fuel electrode layer and a solid electrolyte layer which is sandwiched between the air electrode layer and the fuel electrode layer; a porous base body supporting the cell element layer, the cell element layer being formed on the porous base body such that the air electrode layer or the fuel electrode layer is formed on the porous base body to be joined thereto, and the porous base body having a surface, opposed to another surface on which the cell element layer is laminated, which is formed with recessed portions; and a gas-impermeable member having an electrical conductivity and associated with the solid electrolyte layer to allow gas flowing through the porous base body to be separate from gas flowing outside the porous base body. A plurality of the solid electrolyte fuel cell plate structures are stacked in a direction in which the cell element layers are laminated.

According to another aspect of the present invention, there is provided a solid electrolyte fuel cell electric power generation unit comprising: a solid electrolyte fuel cell stack having a solid electrolyte fuel cell plate structure and a porous base body located adjacent to the solid electrolyte fuel cell stack having a solid electrolyte fuel cell plate structure; and a housing receiving the solid electrolyte fuel cell stack. The solid electrolyte fuel cell plate structure includes: a cell element layer having an air electrode layer, a fuel electrode layer and a solid electrolyte layer which is sandwiched between the air electrode layer and the fuel electrode layer; a porous base body supporting the cell element layer, the cell element layer being formed on the porous base body such that the air electrode layer or the fuel electrode layer is formed on the porous base body to be joined thereto; and a gas-impermeable member having an electrical conductivity and associated with the solid electrolyte layer to allow gas flowing through the porous base body to be separate from gas flowing outside the porous base body. A plurality of the solid electrolyte fuel cell plate structures are stacked via the porous base bodies, adjacent to the fuel cell plate structures, in a direction in which the cell element layers are laminated. Pipe members are located to interconnect the porous base body of the solid electrolyte fuel cell plate structure to outside of the housing.

According to another aspect of the present invention, there is provided a solid electrolyte fuel cell electric power generation unit comprising: a solid electrolyte fuel cell stack having a solid electrolyte fuel cell plate structure; and a housing receiving the solid electrolyte fuel cell stack. The solid electrolyte fuel cell plate structure includes: a cell element layer having an air electrode layer, a fuel electrode layer and a solid electrolyte layer which is sandwiched between the air electrode layer and the fuel electrode layer; a porous base body supporting the cell element layer, the cell element layer being formed on the porous base body such that the air electrode layer or the fuel electrode layer is formed on the porous base body to be joined thereto, and the porous base body having a surface, opposed to another surface on which the cell element layer is laminated, which is formed with recessed portions; and a gas-impermeable member having an electrical conductivity and associated with the solid electrolyte layer to allow gas flowing through the porous base body to be separate from gas flowing outside the porous base body. A plurality of the solid electrolyte fuel cell plate structures are stacked in a direction in which the cell element layers are laminate. Pipe members are located to interconnect the porous base body of the solid electrolyte fuel cell plate structure to outside of the housing.

In other words, the present invention provides a solid electrolyte fuel cell plate structure comprising: a cell element layer having an air electrode layer, a fuel electrode layer and a solid electrolyte layer which is sandwiched between the air electrode layer and the fuel electrode layer; support means for supporting the cell element layer and for allowing gas to pass through the support means, the cell element layer being formed on the support means such that one of the air electrode layer and the fuel electrode layer is formed on the support means to be joined thereto; and gas-impermeable means for causing gas to be impermeable. The gas-impermeable means has an electrical conductivity and associated with the solid electrolyte layer to allow gas flowing through the support means to be separate from gas flowing outside the support means.

On one hand, there is provided a method of manufacturing a solid electrolyte fuel cell plate structure, comprising: preparing a porous base body; forming a cell element layer on the porous base body such that the cell element layer has an air electrode layer, a fuel electrode layer and a solid electrolyte layer which is sandwiched between the air electrode layer and the fuel electrode layer to allow the air electrode layer or the fuel electrode layer to be joined to the porous base body; and forming a gas-impermeable member to be associated with the solid electrolyte layer to allow gas flowing through the porous base body to be separate from gas flowing outside the porous base body, the gas-impermeable member having an electrical conductivity.

Other and further features, advantages, and benefits of the present invention will become more apparent from the following description taken in conjunction with the following drawings.

DETAILED DESCRIPTION OF THE PREFERRED EMBODIMENTS

To describe the present invention in more detail, preferred embodiments of a cell plate structure for a SOFC, a stack to which such a cell plate structure is applied, and an electric power generation unit employing such a stack according to the present invention will be described with reference to the accompanied drawings.

First Embodiment

In general, the cell plate structure for the SOFC according to the present invention is classified into three categories of first to third type cell plate structures. Initially, a fundamental first type cell plate structure is described below.

Figure 1A:
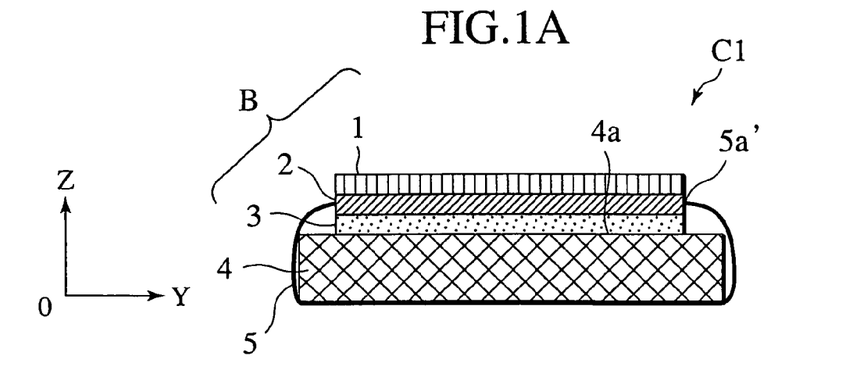
FIG. 1A is a cross sectional view illustrating a cell plate structure of a first preferred embodiment according to the present invention.
Figure 1B:
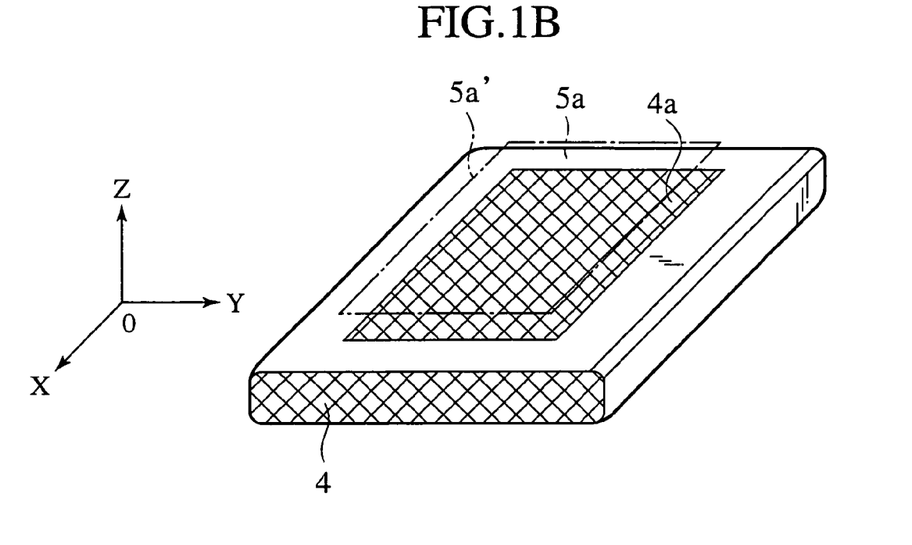
FIG. 1B is a perspective view for conveniently illustrating a window section of a porous base body and a window section of a gas-impermeable film in the cell plate structure.

FIG. 1A is a cross sectional view of the first type cell plate structure of a first preferred embodiment, and FIG. 1B is a perspective view illustrating a porous base body 4 of the first type cell plate structure of the first preferred embodiment and a window section 5a of a gas-impermeable film 5 or the like for convenience' sake. In the drawings, further, X, Y and Z axes form an orthogonal coordinate system.

As shown in FIGS. 1A and 1B, the first cell plate structure C1 of the first preferred embodiment is comprised of a cell element layer B which includes an air electrode layer 1 formed in a rectangular plate shape and supplied with air as oxygen containing gas and made of lanthanum-strontium-manganese oxide (LSM), a fuel electrode layer 3 formed in a rectangular plate shape and supplied with hydrogen and made of nickel-YSZ cermet (YSZ: partially stabilized zirconia added with yttria), and a solid electrolyte layer 2 formed in a rectangular shape and sandwiched between the air electrode layer 1 and the fuel electrode layer 3. The solid electrolyte layer 2 is made of partially stabilized zirconia added with yttria (YSZ). Such a cell element layer B is laminated on a porous base body 4, in a Z-direction, which has a rectangular plate shape made of expanded foam metal (foamed metal) containing nickel-chrome iron to provide electrical conductivity, with the porous base body 4 and the fuel electrode layer 3 being covered with a gas-impermeable film 5, made of nickel-chrome iron foil having an electrical conductivity, which has a characteristic for precluding gas flowing through an internal part of the porous base body 4 from being permeated to the outside while also precluding gas flowing outside the porous base body 4 from being permeated into the internal part thereof.

Here, it is to be noted that both ends, in a X-direction (i.e. in a direction perpendicular to the plane of FIG. 1A), of the electrically conductive gas-impermeable film 5 are not covered and exposed to the outside. That is, the porous base body 4 ensures the flow of hydrogen gas in the X-direction because of the porous property of the base body 4 and due to the both ends of the porous base body 4 and the electrically conductive gas-impermeable film 5 being exposed in the X-direction. Further, the porous base body 4 has an upper surface with a window portion 4a formed in a rectangular shape that is opened to allow hydrogen gas, which flows through the porous base body 4, to be effectively supplied to the fuel electrode layer 3 which is inserted through the window portion 4a and joined to the porous base body 4.

Furthermore, the electrically conductive gas-impermeable film 5 has the window section 5a whose periphery provides a joint portion 5a' adapted to be joined to the solid electrolyte layer 2 for hermetically sealing the fuel electrode layer 3 placed on the porous base body 4. More particularly, the fuel electrode layer 3 is placed on the window portion 4a of the porous base body 4 to allow the electrically conductive gas-impermeable film 5 to be joined to the porous base body 4 and the solid electrode layer 2 which are hermetically sealed with the joint area 5a' of the window section 5a with respect to areas of the porous base body 4 and the solid electrolyte layer 2, i.e. areas wherein the air electrode layer 1, which serves as one electrode layer relative to the other electrode layer formed by the fuel electrode layer 3, is supplied with air.

Of course, the first type cell plate structure C1 of the presently filed preferred embodiment may be modified to allow the air electrode layer 1 and the fuel electrode layer 3 to be laminated in a reversed sequence, i.e. in FIG. 1A, it may be supposed that the air electrode layer 1 serves as the fuel electrode layer 3 whereas the fuel electrode layer 3 serves as the air electrode layer 1. In such a modification, the cell element layer B has a structure wherein the fuel electrode layer is placed on an upper side of the solid electrolyte layer 2 and the air electrode layer 1 is located at a lower side of the solid electrolyte layer 2 so as to sandwich the same, thereby permitting air to be supplied to the air electrode layer via the porous base body 4.

In a more generalized expression, it is said that, according to the first type cell plate structure C1 of the first preferred embodiment, the cell element layer B has a structure wherein at least either one of the air electrode layer 1 and the fuel electrode layer 3 is laminated on and joined to the porous base body 4 while the electrically conductive gas-impermeable film 5 and the solid electrolyte layer 2 are so arranged as to separate gas flowing through the porous body to be supplied to the one electrode and gas flowing outside the porous base body 4 to be supplied to the other electrode from one another.

Now, a method of fabricating the first type cell plate structure of the present preferred embodiment is described below in detail.

First, the window portion 4a is formed at an upper wall of a nickel-chrome iron based expanded foam metal plate which forms the porous base body 4 while, on the other hand, the rectangular window section 5a is formed at a side wall of a longitudinally extending, cylindrical shape nickel-chrome iron foil which forms the electrically conductive gas-impermeable film 5.

Next, the nickel-chrome iron expanded form plate 4 is inserted in the X-direction through the nickel-chrome iron foil 5 to allow the nickel-chrome iron expanded foam metal plate 4 to be covered with the nickel-chrome iron foil 5 such that the window portion 4a of the nickel-chrome iron expanded foam metal plate 4 is aligned with the window section 5a of the nickel-chrome iron foil 5.

Under this condition, the nickel-chrome iron foil 5 is adhered to a bottom wall of the nickel-chrome iron expanded foam metal plate 4 by brazing under reduced pressure. During this work period, it is ensured for the nickel-chrome iron expanded foam metal plate 4 to have a gas-permeable property in the X-direction.

In a subsequent step, an inner area of the window portion 4a of the nickel-chromium-iron expanded foam metal plate 4 is coated with a layer of nickel-YSZ cermet, which forms the fuel electrode layer 3, by a printing technique, with the coated layer being baked at the temperature of about 800° C. Upon baking at the temperature of 800° C. for a given time interval, the Ni-YSZ cermet layer 3 and the nickel-chrome-iron foil 5 are ground.

Successively, a YSZ layer is formed on the ground Ni-YSZ cermet layer 3 by thermal spraying to form the solid electrolyte layer 2 while closing the joint portion 5a' formed around the periphery of the window section 5a of the nickel-chromium-iron foil 5 for realizing a hermetic sealing effect between the inside and outside areas of the nickel-chromium-iron expanded foam metal plate 4.

Finally, after completion of the formation step of the YSZ layer 2, an LSM layer is coated on the YSM layer 2 by a printing technique to form the air electrode layer 1 and is baked at the temperature of about 800° C. for a given time interval to obtain the cell plate structure C1.

With the structure of the present preferred embodiment discussed above, the presence of the electrically conductive gas-impermeable film which is used for concealing between the porous base body and the solid electrolyte layer of the cell element enables gas flowing through the porous base body and the neighboring electrode layer to be effectively precluded from being brought into contact with gas flowing outside the porous base body.

Further, the use of the expanded foam metal for the porous base body compels it to have a sufficiently enhanced gas diffusion characteristic without the need for forming a hollow structure using a forming technology, resulting in simplified manufacturing steps.

Furthermore, since the electrically conductive gas-impermeable film 5 per se achieves both functions as gas shielding material and interconnector material for providing electrical connection, the use of one kind of material enables such both functions to be realized in a simple step, with a resultant decrease in manufacturing cost, the number of manufacturing steps and a manufacturing time period. Moreover, since the gas shielding is performed with nickel-chrome iron that is metal, it has a higher reliability in gas shielding effect than that of the other materials.

In addition, since all of the component elements except for the cell element are made of metal, they have an excellent electric conductivity with a reduced loss in electric power output, resulting in an improved electric power generating efficiency.

Further, when a stack is formed using such a first type cell plate structure, the presence of the gas-impermeable film having the electrical conductivity compels the same to serve as the interconnector to establish electrical connection between the adjacent cell plates, thereby avoiding the need for additionally providing a specific interconnector.

Furthermore, when a stack is formed using such a first type cell plate structure and is applied to the SOFC, the first type cell plate structure per se combines the same preferable gas shielding property as that of the cylindrical type SOFC and the same high electric power generating density as that of the flat plate type SOFC.

Incidentally, in the preferred embodiment, although the solid electrolyte, which forms the solid electrolyte layer, has been described as employing YSZ, it is not particularly limited thereto and, in alternative way, the solid electrolyte may be formed of material having oxygen ion conductance such as stabilized zirconia containing yttria ($Y_2O_3$) and, in addition thereto, neodymium oxide ($Nd_2O_3$), samarium oxide ($Sm_2O_3$), scandium oxide ($Sc_2O_3$) or gadolinium oxide ($Gd_2O_3$), ceria ($CeO_2$) system solid solution, bismuth oxide solid solution and element substituted material of $LaGaO_3$.

Further, the air electrode layer is made of material composed of LSM ($La_{1-x}Sr_xMnO_3$) and, in addition thereto, it may be made of Perovskyte type oxidized product such as $La_{1-x}Sr_xCoO_3$.

Furthermore, the fuel electrode layer is made of material composed of nickel-YSZ cermet and also may be made of nickel or platinum. Moreover, in an alternative choice, both electrode layers may be formed of the same materials.

Further, the porous base body may not be limited to a particular material provided that the particular material is able to mechanically support the cell element layer formed of the laminated structure of air electrode layer-solid electrolyte layer-fuel electrode layer while having a porous property sufficient for permitting fuel gas or air to internally pass therethrough. Such materials involve expanded foam metal of nickel-chrome iron and, in addition thereto, heat-resistant porous ceramic such as alumina, and porous metal such as nickel, nickel-chrome, nickel-chrome-tungsten-molybdenum, nickel-cobalt and nickel-copper. Moreover, it may be possible to use a fibrous body such as a felt. In a more generalized expression, the porous base body may be made of a sintered body of metallic fibers, a sintered body of metallic particles or electrically conductive ceramic material, and a combination of these materials.

Incidentally, if the porous base body has electrically conductive property, electric power to be consumed by the same is eliminated, resulting in an improvement over electric power generating efficiency per unit cell of the cell plate structure. Thus, it is possible for expanded foam metal and electrically conductive ceramic to be preferably used as the porous base body. Also, it is easy for expanded foam metal to enhance the gas diffusing property while providing an ease of manufacturing the porous base body as compared to that of other material.

In addition, the electrically conductive gas-impermeable film is sufficient for its electrical conductivity and an impermeable property for fuel gas and air and is made of, for example, a nickel-chromium iron foil and other metal foils containing nickel, nickel-chrome, nickel-chrome-tungsten-molybdenum, nickel-cobalt, and nickel-copper etc. that are particularly useful for an increased reliability in a gas shielding effect.

Incidentally, the use of the porous base body which is made of expanded foam metal and the electrically conductive gas-impermeable film made of various metal foils allows the cell plate structure and the unit cell to be made of metal except for the cell elements, providing an increased electric power generating efficiency.

Second Embodiment

Now, another example of the first type cell plate structure of the cell plate structure of the SOFC according to the present invention is described in detail as a second preferred embodiment. Also, the cell plate structure C2 of the second preferred embodiment fundamentally has the same structure as the cell plate structure C1 of the first preferred embodiment except for a detailed structure of the electrically conductive gas-impermeable material 5. In the second preferred embodiment, like parts bear the same reference numerals as those used in the cell plate structure C1 of the first preferred embodiment, and a detailed description of the same is herein omitted with a detailed description being particularly given to differential points.

Figure 2:
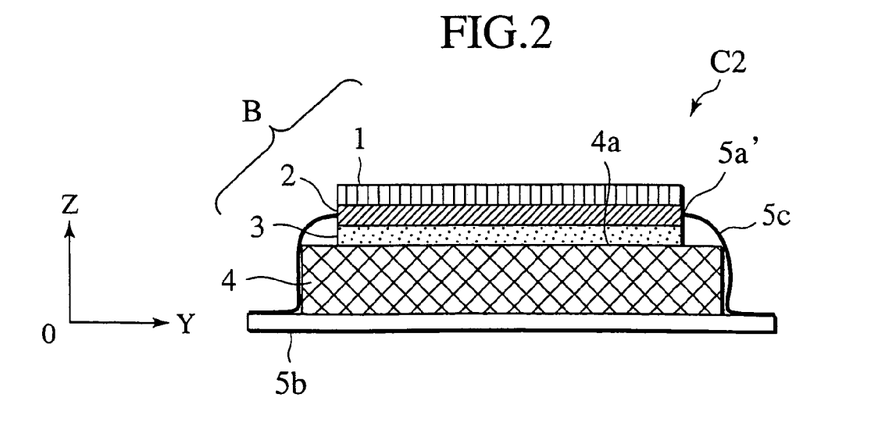
FIG. 2 is a cross sectional view illustrating a cell plate structure of a second preferred embodiment according to the present invention.

FIG. 2 is a cross sectional view, which is equivalent to FIG. 1A, illustrating the cell plate structure C2 of the second preferred embodiment.

As shown in FIG. 2, in the second preferred embodiment, the porous base body 4 is located on a nickel-chrome iron plate 5b and an upper portion of a nickel-chrome iron foil 5c is located at the upper wall side (in the vicinity of the window portion 4a) of the porous base body 4 while the nickel-chrome iron plate 5b and the nickel-chrome iron foil 5c are joined together by means of laser welding technique to form the electrically conductive gas-impermeable film 5. Other structural parts are similar to those of the cell plate structure C1 of the first preferred embodiment.

Although the cell plate structure C2 of the second preferred embodiment has the same operation and effect as those of the first preferred embodiment, the cell plate structure C2 has another advantage in that it is further easy to carry out a shielding operation for providing a gas shielding property.

Incidentally, the plate material 5b that forms the electrically conductive gas-impermeable film 5 may be made of nickel-chrome iron plate and, in addition thereto, plate material containing nickel, nickel-chrome, nickel-chrome-tungsten-molybdenum, nickel-cobalt and nickel steel.

Third Embodiment

Now, another example of the first type cell plate structure of the cell plate structure of the SOFC according to the present invention is described below in detail as a third preferred embodiment. Also, the cell plate structure C3 of the third preferred embodiment fundamentally has the same structure as the cell plate structure C1 of the first preferred embodiment except for a detailed structure of the electrically conductive gas-impermeable film 5. In the third preferred embodiment, like parts bear the same reference numerals as those used in the cell plate structure C1 of the first preferred embodiment, and a detailed description of the same is herein omitted with a detailed description being particularly given to differential points.

Figure 3:
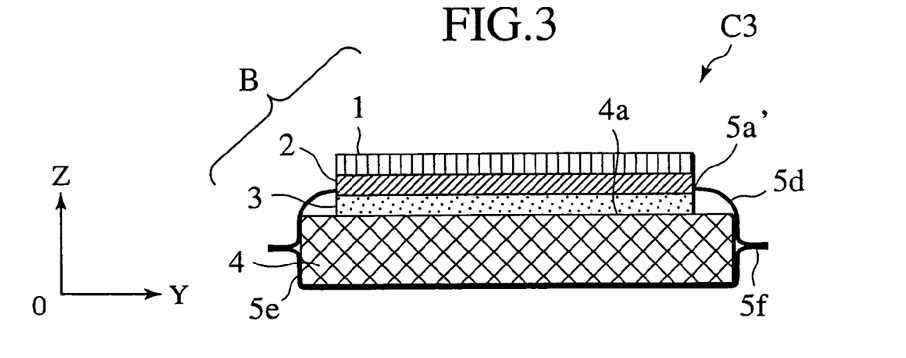
FIG. 3 is a cross sectional view illustrating a cell plate structure of a third preferred embodiment according to the present invention.

FIG. 3 is a cross sectional view, which is equivalent to FIG. 1A, illustrating the cell plate structure C3 of the third preferred embodiment.

As shown in FIG. 3, chrome iron foils 5d and 5e are located over both an upper side and a lower side of an expanded foam metal plate 4 of nickel-chrome iron, with marginal portions of the chrome iron foils 5d and 5e being formed with flange-shaped joint portions 5f which are joined together to achieve a gas shielding effect. Other structural parts of the cell plate structure C3 are similar to those of the first preferred embodiment.

Although the cell plate structure C3 of the third preferred embodiment has the same operation and effect as those of the first preferred embodiment, the cell plate structure C3 has another advantage in that it is further easy to carry out a shielding operation for providing a gas shielding property.

Incidentally, performances of the cell plate structures of the first to the third preferred embodiments discussed above are evaluated with respect to one another and summarized as shown in a table listed below. In the table, further, a symbol "Δ" designates that the performance is rather degraded than the most excellent performance when implementing evaluation of the performances relative to one another.

|  | Thinness/Lightness | Joint Points | Strength | Shielding Operation |
| --- | --- | --- | --- | --- |
| 1st Embodiment | Preferable | Fewer | Δ | Δ |
| 2nd Embodiment | Preferable | Δ | Δ | Easy |
| 3rd Embodiment | Δ | Δ | High | Easy |

Fourth Embodiment

A second type cell plate structure of the cell structure of the SOFC according to the present invention is described below in detail as a fourth preferred embodiment. Also, the cell plate structure C4 of the fourth preferred embodiment fundamentally has the same structure as the cell plate structure C2 of the second preferred embodiment except for a detailed structure of the plate material 15b on which the porous base body 4 is stacked, and relates to the second type cell plate structure which is different in structure from those of the first to third preferred embodiments discussed above. In the fourth preferred embodiment, like parts bear the same reference numerals as those used in the cell plate structure of the second preferred embodiment, and a detailed description of the same is herein omitted with a detailed description being particularly given to differential structural parts.

Figure 4A:
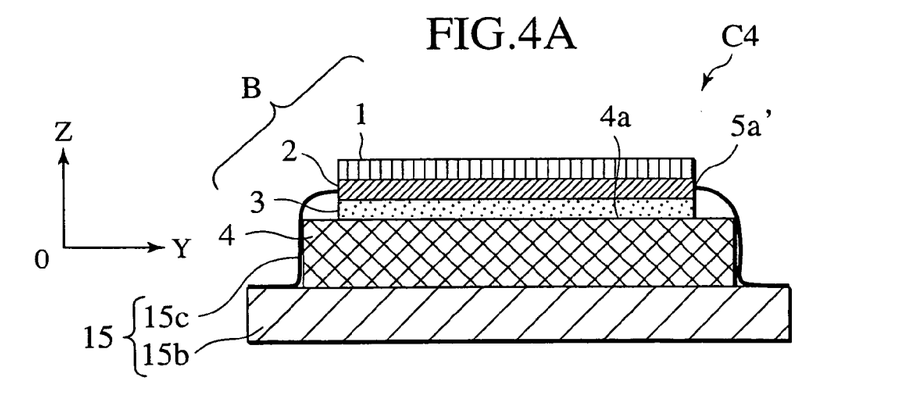
FIG. 4A is a cross sectional view illustrating a cell plate structure of a fourth preferred embodiment according to the present invention.
Figure 4B:
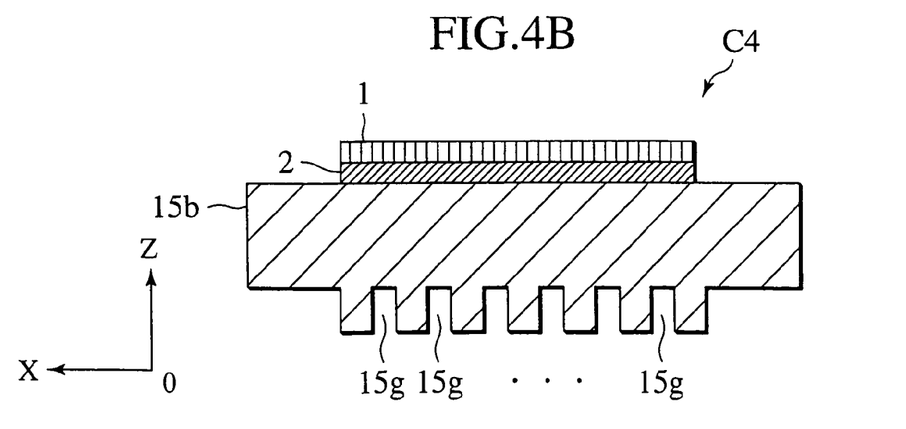
FIG. 4B is a cross sectional view of the cell plate structure, taken on a plane perpendicular to the cross sectional view shown in FIG. 4A, with component parts being shown in a simplified fashion.

FIG. 4A is a cross sectional view, which is equivalent to FIG. 2, illustrating the cell plate structure C4 of the fourth preferred embodiment, and FIG. 4B is a cross sectional view, taken on line perpendicular to the cross sectional view of FIG. 4A, illustrating the cell plate structure whose fuel electrode layer 3, the porous base body 4 and a foil element 15c of the electrically conductive gas-impermeable membrane 15 are omitted to conveniently highlight the plate material 15b for the sake of illustration.

As shown in FIGS. 4A and 4B, the cell plate structure C4 of the fourth preferred embodiment is identical in structure with the cell plate structure of the second preferred embodiment in that the porous base body 4 is stacked on a nickel-chrome iron plate 15b and in that the nickel-chrome iron plate 15b and the nickel-chrome iron foil 15c are joined together by laser welding to form the electrically conductive gas-impermeable film 15. On the contrary, the cell plate structure C4 has a feature in that a lower surface of the nickel-chrome iron plate 15b is formed with a plurality of recessed portions 15g that extend in the Y-direction in parallel to one another. Other structural parts of the cell plate structure C4 are identical to those of the second preferred embodiment.

In a more generalized expression, the second type cell plate structure C4 of the fourth preferred embodiment has a structure in that at least either one of the air electrode layer 1 and the fuel electrode layer 3 of the cell element layer B is joined with the porous base body 4 to be stacked thereon under such a joined condition. Further, the solid electrolyte layer 2 and the electrically conductive gas-impermeable film 15 are so located with respect to one another to separate gas which internally flows through the porous base body 4 to be supplied to one of the electrode layers and gas which flows outside porous base body 4 to be supplied to the other one of the electrode layers. Furthermore, the porous base body 4 is stacked on the plate member 15b that forms a part of the electrically conductive gas-impermeable film 15. Moreover, the lower surface, opposed to the upper surface on which the porous base body 4 is stacked, of the plate member 15b has the plural recessed portions 15g to compel them to permit the flow of gas to be supplied to the other one of the electrode layers.

With such a structure, although the second type cell plate structure C4 of the fourth preferred embodiment has the same operation and effect as those of the second preferred embodiment, the second type cell plate structure C4 has another advantage in that the presence of the recessed portions formed on the lower surface of the plate member which forms a part of the electrically conductive gas-impermeable film compels the recessed portions to serve as gas flow passages when a plurality of such cell plate structures are assembled in a stack for providing simplified steps of forming the stack in an easier fashion.

Incidentally, in the fourth preferred embodiment, it is possible for the foil member 15c and the plate member 15b, which form the electrically conductive gas-impermeable film 15, to be made of nickel-chrome iron plate and, in addition thereto, the foil member made of plate member containing nickel, nickel-chrome, nickel-chrome-tungsten-molybdenum, nickel-cobalt and nickel-copper, etc.

Further, two streams of different gases may not necessarily intersect with one another, provided that the two streams of different gases are held out of contact with one another, and may be aligned in the same direction if desired.

Fifth Embodiment

A third type cell plate structure of the cell structure of the SOFC according to the present invention is described below in detail as a fifth preferred embodiment. Also, the cell plate structure C5 of the fifth preferred embodiment fundamentally has the same structure as the cell plate structure of the first preferred embodiment except for a structure wherein the cell plate structures are stacked in one piece and relates to a third type cell plate structure which is different from the first type cell plate structure discussed in conjunction with the first to third preferred embodiment and the second type cell plate structure discussed in conjunction with the fourth preferred embodiment. In the fifth preferred embodiment, like parts bear the same reference numerals as those used in the cell plate structure of the first preferred embodiment and a description of the same components parts is herein omitted with only different structural parts being described in detail.

Figure 5:
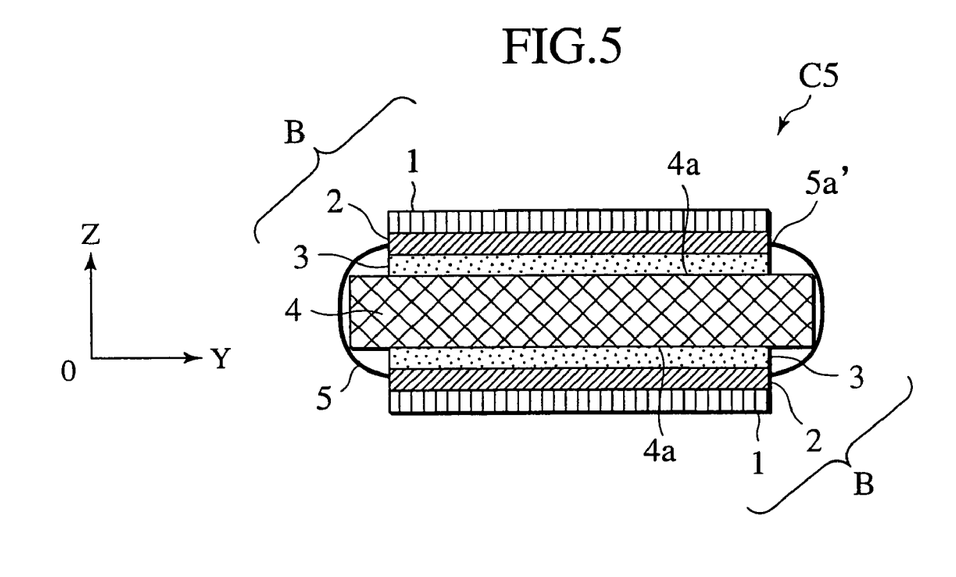
FIG. 5 is a cross sectional view illustrating a cell plate structure of a fifth preferred embodiment according to the present invention.

FIG. 5 is a cross sectional view, which is equivalent to FIG. 1A, illustrating the cell plate structure C5 of the fifth preferred embodiment.

As shown in FIG. 5, the cell plate structure C5 of the fifth preferred embodiment has the same structure as that of the first preferred embodiment in that the fuel electrode layer 3 made of Ni-YSZ cermet, the solid electrolyte layer 2 made of YSZ and the air electrode layer made of LSM are stacked on the upper surface of the porous base body 4 in a sequence and, in a similar manner, the fuel electrode layer, the solid electrolyte layer 2 and the air electrode layer are also stacked on the lower surface of the porous base body 4 in a sequence. That is, the cell plate structure C5 shown in FIG. 5 has a symmetrical laminated structure with respect to a X-Y plane that intersects the Z-axis representing a stacked direction. In a more simplified expression, in the cross sectional view shown in FIG. 5, the cell plate structure C5 has a symmetrical laminated structure with respect to a symmetric axis of the porous base body 4.

And, like in the first preferred embodiment, the electrically conductive gas-impermeable film 5 made of nickel-chrome iron foil partially conceals the porous base body 4 and the fuel electrode layer 3 at the upper and lower sides of the porous base body 4. In this connection, the cell plate structure C5 of the fifth preferred embodiment has a laminated structure that is symmetric with respect to the X-Y plane.

Further, when fabricating the cell plate structure of the fifth preferred embodiment, the fuel electrode layer 3, the solid electrolyte layer 2 and the air electrode layer 1 are stacked in sequence on both the upper and lower sides of the porous base body 4 by carrying out the same steps as discussed with reference to the first preferred embodiment. During such fabricating steps, of course, there is a need for forming the window portions 4a at the upper and lower surfaces of the porous base body 4 and for joining the terminal ends of the respective electrically conductive gas-impermeable films 5 at the upper and lower solid electrolyte layers 2 to ensure a hermetic sealing performance.

Here, in a more generalized expression, the third type cell plate structure C5 has a cross sectional structure which includes the cell plate structure formed in the same structure as the first preferred embodiment and turned over in an arrangement, with an additional cell plate structure being stacked on the upper side of the porous base body 4 such the upper and lower cell plate structures have a symmetric relationship with respect to a symmetric axis or a symmetric plane of the porous base body 4. In other words, it is concluded that operating the first type cell plate structure in a line-symmetric manner with respect to the porous base body allows the third type cell plate structure to be obtained.

With such a structure described above, the third cell plate structure of the fifth preferred embodiment has both a desired hermetic sealing property and high electric power generating density like in that of the first preferred embodiment. When forming a stack using such a cell plate structure, there is no need for additionally preparing a specific interconnector. Further, when forming the stack using such a cell plate structure, it is possible for a parallel-connection type electric circuitry to be manufactured in an easy fashion.

Sixth Embodiment

Another example of the third type cell plate structure of the cell structure of the SOFC according to the present invention is described below in detail as a sixth preferred embodiment. Also, the cell plate structure C6 of the sixth preferred embodiment fundamentally has the same stacked structure as the cell plate structure of the fifth preferred embodiment, with the exception in that electrically conductive gas-impermeable films 5 are arranged in the same structure as those of the cell plate structure of the third preferred embodiment, and relates to the third type cell plate structure. In the sixth preferred embodiment, like parts bear the same reference numerals as those used in the cell plate structure of the fifth preferred embodiment and a description of the same components parts is herein omitted with only different structural parts being described in detail.

Figure 6:
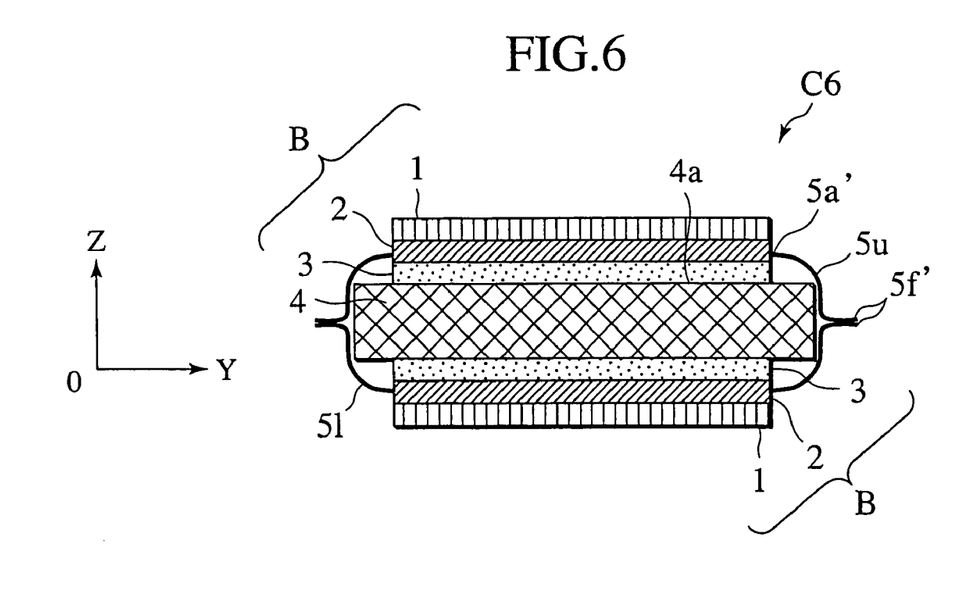
FIG. 6 is a cross sectional view illustrating a cell plate structure of a sixth preferred embodiment according to the present invention.

FIG. 6 is a cross sectional view, which is equivalent to FIG. 5, illustrating the cell plate structure C6 of the sixth preferred embodiment.

As shown in FIG. 6, the cell plate structure C6 of the sixth preferred embodiment has the same structure as that of the fifth preferred embodiment in that the fuel electrode layer 3, the solid electrolyte layer 2 and the air electrode layer are sequentially stacked on the upper and lower sides of the porous base body 4 such that the cell plate structure C6 shown in FIG. 6 has a symmetrical laminated structure with respect to the X-Y plane that intersects the Z-axis representing the stacked direction. In a more simplified expression, in the cross sectional view shown in FIG. 6, the cell plate structure C6 has a symmetrical laminated structure with respect to the symmetric axis of the porous base body 4.

And, the electrically conductive gas-impermeable film 5 made of chrome iron foil has an upper component 5$u$ covering an upper side of the porous base body 4 and a lower component 5$l$ covering a lower side of the porous base body 4, with the upper and lower components 5$u$ and 5$l$ being joined together at flanged shaped joint portions 5$f'$ to provide a gas-tight sealing effect. In this connection, the cell plate structure C6 of the sixth preferred embodiment has the laminated structure that is symmetric with respect to the X-Y plane.

With such a structure described above, the cell plate structure of the sixth preferred embodiment has the same effects and advantages as those of the cell plate structure of the fifth preferred embodiment and, in addition thereto, has an advantage in that it is further easy to implement the sealing work.

Seventh Embodiment

Now, a SOFC stack applying the cell plate structure of the SOFC according to the present invention is described below in detail as a seventh preferred embodiment. In the seventh preferred embodiment, the SOFC stack S1 is composed of the cell plate structures C1 of the first preferred embodiment each of which forms the first type cell plate structure. In the seventh preferred embodiment, like parts bear the same reference numerals as those used in the cell plate structure of the first preferred embodiment and a description of the same components parts is herein omitted with only different structural parts being described in detail.

Figure 7A:
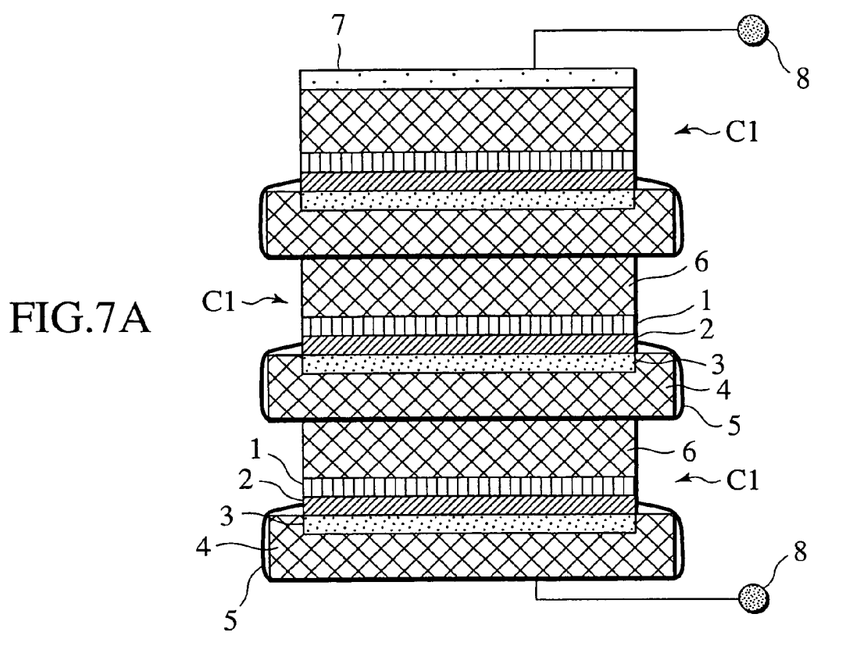
FIG. 7A is a cross sectional view illustrating a stack of a seventh preferred embodiment according to the present invention.
Figure 7B:
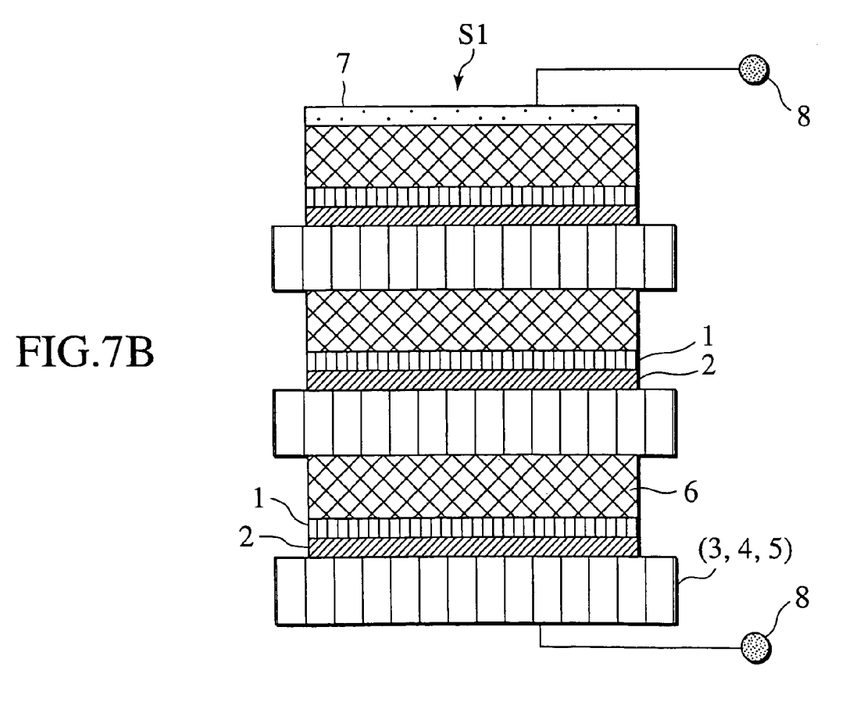
FIG. 7B is a cross sectional view of the stack, taken on a plane perpendicular to the cross sectional view shown in FIG. 7A, with component parts being shown in a simplified fashion.

FIG. 7A is a cross sectional view, which is equivalent to FIG. 1A, illustrating the SOFC stack S1 of the seventh preferred embodiment and FIG. 7B is a cross sectional view, taken in a plane perpendicular to the cross sectional view shown in FIG. 7A, of the SOFC stack with the fuel electrode layer 3, the porous base body 4 and the electrically conductive gas-impermeable film 5 being shown in a simplified form for the sake of simplicity of illustration.

As shown in FIGS. 7A and 7B, the SOFC stack S1 of the seventh preferred embodiment is comprised of the cell plate structures C1 and expanded foam metal plates of nickel-chrome iron that are alternately stacked to provide a laminated structure whose upper surface covered with a current collecting plate 7 made of nickel-chrome iron. Output power take-out terminals 8, 8 are connected to the current collecting plate 7, located on such a laminated structure, and the electrically conductive gas-impermeable film 5 made of nickel-chrome iron foil located at the bottom surface thereof.

With the structure of such a SOFC stack of the seventh preferred embodiment, not only the cell plate structures per se have characterized effects and advantages described above, but also the SOFC provides an ease of carrying out the laminating steps to enable a series-connected circuit to be obtained. The use of such SOFC stack enables the SOFC having a high supply voltage to be obtained.

Incidentally, the use of flexible material, such as a felt, as the porous base body 4 allows a stress to be avoided from being applied to the cell plate structure, and the presence of the laminated structure using such material enables the cell plate structure to be effectively avoided from being damaged.

Furthermore, when manufacturing the SOFC stack of the seventh preferred embodiment, it is preferable for the porous base body, which is newly added, to have electrical conductivity to establish electrical connection in an easy and reliable manner.

Also, it is of course possible to assemble the cell plate structures of the second and third preferred embodiments of another example of the first type cell plate structure in a laminated stack in a similar fashion to form the SOFC stack which has the series-connected circuit configuration.

Eighth Embodiment

Now, another example of the SOFC stack applied with the cell plate structure of the SOFC according to the present invention is described below in detail as an eighth preferred embodiment. In the eighth preferred embodiment, the SOFC stack S2 is applied with and composed of the first type cell plate structure C2 of the second preferred embodiment and the second type cell plate structures C4 of the fourth preferred embodiment stacked on the first type cell structure C2. In the eighth preferred embodiment, like parts bear the same reference numerals as those used in the cell plate structures of the second and fourth preferred embodiments and a description of the same components parts is herein omitted with only different structural parts being described in detail.

Figure 8A:
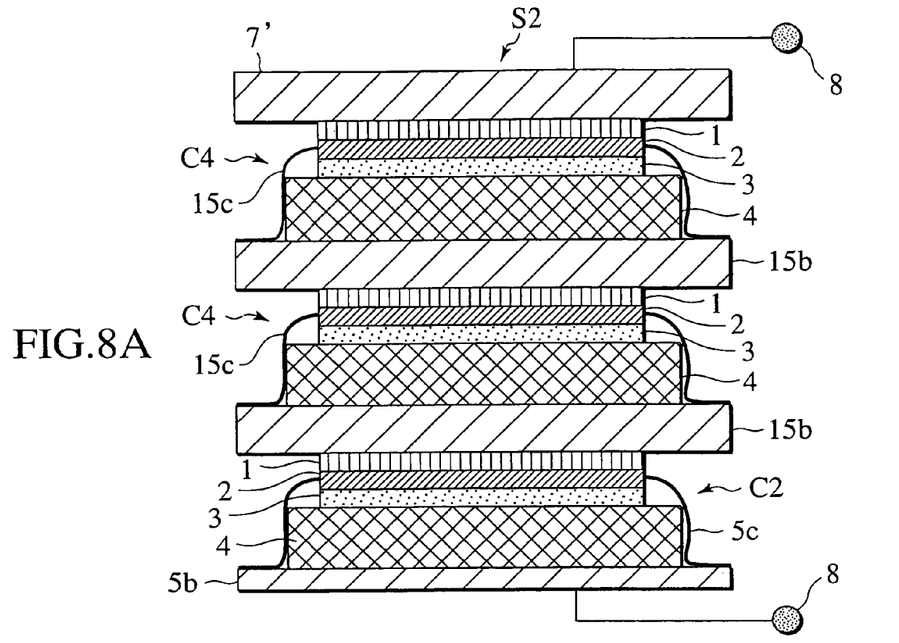
FIG. 8A is a cross sectional view illustrating a stack of an eighth preferred embodiment according to the present invention.
Figure 8B:
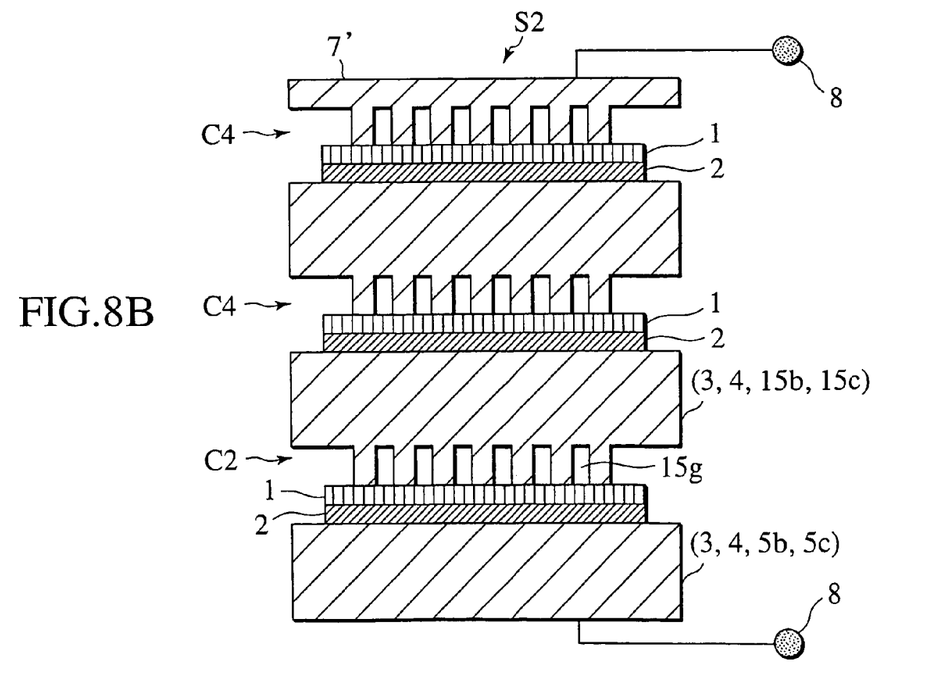
FIG. 8B is a cross sectional view of the stack, taken on a plane perpendicular to the cross sectional view shown in FIG. 8A, with component parts being shown in a simplified fashion.

FIG. 8A is a cross sectional view, which is equivalent to FIGS. 2 and 4A, illustrating the SOFC stack S2 of the eighth preferred embodiment and FIG. 8B is a cross sectional view, taken in a plane perpendicular to the cross sectional view shown in FIG. 8A, of the SOFC stack with the fuel electrode layer 3, the porous base body 4 and the electrically conductive gas-impermeable films 5b, 5c and 15b, 15c being shown in a simplified form for the sake of simplicity of illustration.

As shown in FIGS. 8A and 8B, the SOFC stack S2 of the eighth preferred embodiment is comprised of the first type cell plate structures C2 of the second preferred embodiment on which the second type cell plate structures C4 of the fourth preferred embodiment are stacked in sequence to form the laminated stack whose upper surface is mounted with a current collecting plate 7', made of nickel-chrome iron, which is formed with recessed portions. Output power take-out terminals 8, 8 are connected to the current collecting plate 7' and the electrically conductive gas-impermeable membrane 5b made of nickel-chrome iron foil located at the bottom surface thereof. With such a structure, air to be supplied to the air electrode layers 1 flow through the plurality of recessed portions 15g formed in the respective plate members 15b which form the electrically conductive gas-impermeable film 15b of the respective cell plate structures C4.

With the structure of such a SOFC stack of the eighth preferred embodiment, not only the cell plate structures per se have the same effects and advantages of that of the seventh preferred embodiment described above, but also the SOFC stack has another advantage in that, in principle, laminating suitable number of cell plate structures of the fourth preferred embodiment allows the SOFC stack to be obtained. Further, air to be supplied to the air electrode 1 flows through the plurality of recessed portions 15g formed in the electrically conductive gas-impermeable film 15b of the cell plate structure C4, resulting in further simplified steps of manufacturing the SOFC stack without the need for preparing additional porous base body 6 that would be required in the seventh preferred embodiment.

Incidentally, in the eighth preferred embodiment, although the cell plate structure C2 of the second preferred embodiment is located at the lowest layer of the SOFC stack, it may be possible for the cell plate structure C4 of the fourth preferred embodiment to be located at the lowest layer of the stack with a view to further simplifying the component parts such that the SOFC stack is comprised of the cell plate structures of the same construction.

Further, it may of course be possible for the first type one of other cell plate structure to be suitably combined if desired.

Furthermore, the streams of gas flows may not necessarily intersect one another, provided that the streams of gas flows in different kinds are held out of contact with one another, and may be oriented in the same direction if desired.

Ninth Embodiment

Now, another example of the SOFC stack applied with the cell plate structure of the SOFC according to the present invention is described below in detail as a ninth preferred embodiment. In the ninth preferred embodiment, the SOFC stack S3 is applied with and composed of the third type cell plate structures C5, of the fifth preferred embodiment, which are stacked on one another. In the ninth preferred embodiment, like parts bear the same reference numerals as those used in the cell plate structures of the fifth preferred embodiment and a description of the same components parts is herein omitted with only different structural parts being described in detail.

Figure 9:
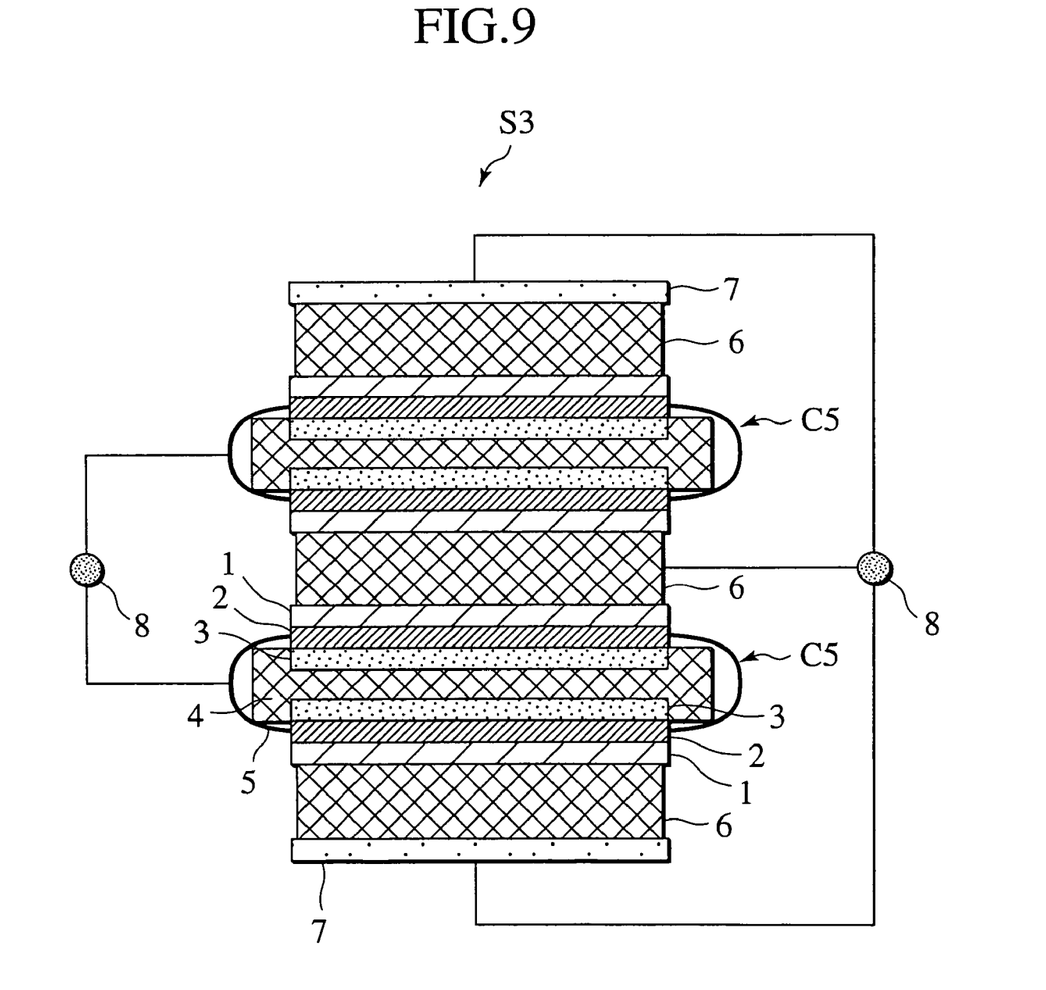
FIG. 9 is a cross sectional view illustrating a stack of a ninth preferred embodiment according to the present invention.

FIG. 9 is a cross sectional view, which is equivalent to FIG. 5, illustrating the SOFC stack S3 of the ninth preferred embodiment.

As shown in FIG. 9, the SOFC stack S3 of the ninth preferred embodiment is comprised of the third type cell plate structures C5 of the fifth preferred embodiment and a plurality of the expanded foam metal plate 6 of nickel-chrome iron, serving as the porous base bodies 6 of the seventh preferred embodiment, which are alternately stacked to form a laminated stack which has upper and lower surfaces covered with current collecting plates 7, 7 made of nickel-chrome iron. Output power take-out terminals 8, 8 are connected to the current collecting plate 7, 7 and the respective nickel-chrome iron foils 5, 5 of the type used in the seventh preferred embodiment.

With the structure of such a SOFC stack of the ninth preferred embodiment, not only the cell plate structures per se have the same effects and advantages as those described above, but also the SOFC stack has another advantage in that laminating the cell plate structures in simplified steps allows the SOFC stack arranged in a parallel-connection circuit to be obtained.

Incidentally, the use of flexible material, such as a felt, as the porous base body 6 allows a stress to be avoided from being applied to the cell plate structure, and the presence of the laminated structure using such material enables the cell plate structure to be effectively avoided from being damaged.

Furthermore, when manufacturing the SOFC stack of the ninth preferred embodiment, it is preferable for the porous base body, which is newly added, to have electrical conductivity to establish electrical connection in an easy and reliable manner.

Also, it is of course possible to assemble the cell plate structures of another example of the third type cell plate structure described in conjunction with the seventh preferred embodiment in a laminated stack in a similar fashion to form the SOFC stack which has the parallel-connected circuit configuration.

Tenth Embodiment

Lastly, an electric power generation unit applied with the SOFC stack using the cell plate structure of the SOFC according to the present invention is described below in detail as a tenth preferred embodiment. In the tenth preferred embodiment, the electric power generation unit is applied with and composed of the SOFC stack S3 of the seventh preferred embodiment. In the tenth preferred embodiment, like parts bear the same reference numerals as those used in the SOFC stack of the seventh preferred embodiment and a description of the same components parts is herein omitted with only different structural parts being described in detail.

Figure 10A:
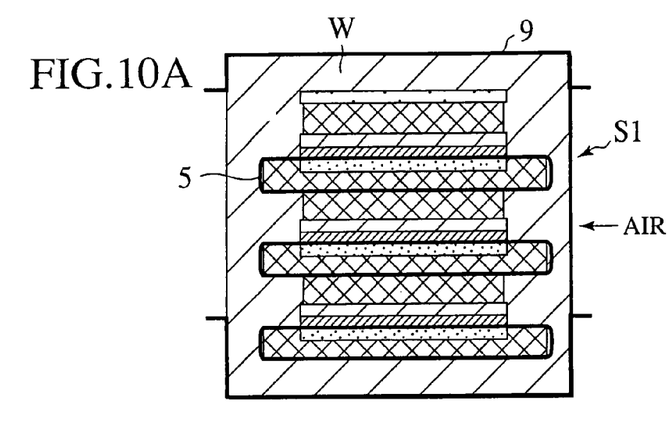
FIG. 10A is a cross sectional view illustrating an electric power generation unit of a tenth preferred embodiment according to the present invention.
Figure 10B:
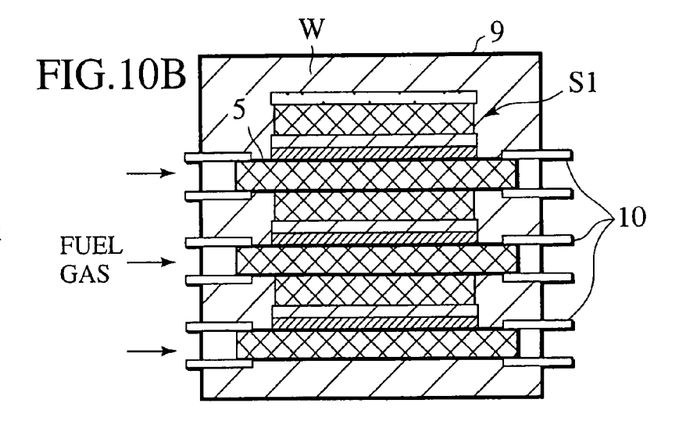
FIG. 10B is a cross sectional view of the electric power generation unit, taken on a plane perpendicular to the cross sectional view shown in FIG. 10A.
Figure 11A:
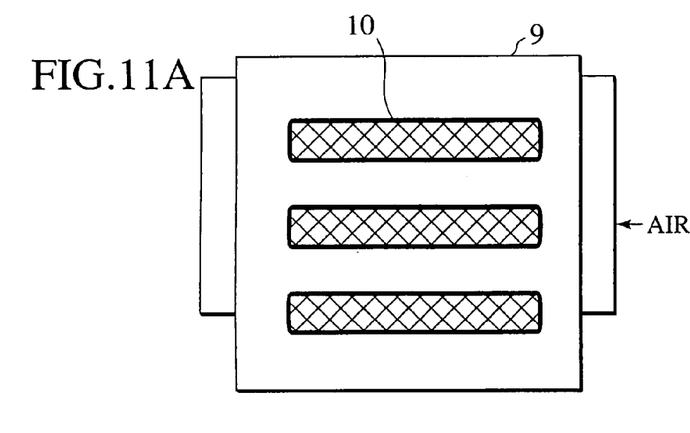
FIG. 11A is an external view of the electric power generation unit shown in FIG. 10A
Figure 11B:
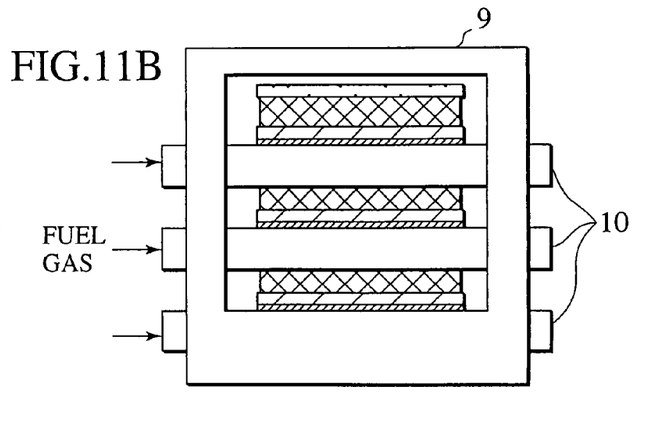
FIG. 11B is an external view of the electric power generation unit shown in FIG. 10B.

FIG. 10A is a cross sectional view, which is equivalent to FIG. 7A, illustrating the SOFC electric power generating unit of the tenth preferred embodiment and FIG. 10B is a cross sectional view illustrating a cross section perpendicular to the cross sectional view of FIG. 10A. FIG. 11A is an external view that corresponds to FIG. 10A, and FIG. 11B is an external view that corresponds to FIG. 10B.

As shown in FIGS. 10A to 11B, the electric power generation unit of the tenth preferred embodiment has a structure wherein the SOFC stack S1 of the seventh preferred embodiment is received and fixedly secured in a housing 9 through which a plurality of pipes 10 made of alumina extend in an electrically insulated manner and are connected to end portions of respective electrically conductive gas-impermeable films 5, each made of nickel-chrome iron foil, to allow hydrogen gas to be introduced thereto, with a ceramic wool W being filled in a space between the housing 9 and the SPOFC stack S1.

According to the electric power generation unit of the tenth preferred embodiment, it is possible for the SOFC electric power generation unit, which has a reduced electric resistance in a stacked direction, to be obtained in simplified manufacturing steps.

Incidentally, the present invention is not limited to the SOFC stack of the seventh preferred embodiment to be employed in the electric power generation unit, and it may be possible for the SOFC electric power generation of the series-connected circuit or the parallel-connected circuit to be constructed using the SOFC stacks of the eight and ninth preferred embodiments or the SOFC stack which suitably includes the cell plate structures of the first to sixth preferred embodiments Further, it is intended that the particular shapes and materials discussed in conjunction with the various preferred embodiments discussed above are illustrative only and not limiting the present invention and that any shape or material with equivalent functions may be suitably employed if desired.

The entire content of a Patent Application No. TOKUGAN 2001-123990 with a filing date of Apr. 23, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A solid electrolyte fuel cell stack, comprising:
   a solid electrolyte fuel cell plate structure; and
   a first porous base body disposed adjacent to the solid electrolyte fuel cell plate structure,
   wherein the solid electrolyte fuel cell plate structure includes:
   a cell element layer having an air electrode layer, a fuel electrode layer and a solid electrolyte layer which is sandwiched between the air electrode layer and the fuel electrode layer;
   a second porous base body supporting the cell element layer, the cell element layer being formed on the second porous base body such that the air electrode layer or the fuel electrode layer is formed on the second porous base body to be joined thereto; and
   a unitary gas-impermeable member having an electrical conductivity and being a foil folded or bent to be joined to the solid electrolyte layer to hermetically seal corresponding one of the air electrode layer and the fuel electrode layer which is formed on the second porous base body, thereby allowing gas flowing through the second porous base body to be separated from gas flowing outside the second porous base body,
   and wherein a plurality of the solid electrolyte fuel cell plate structures are stacked via the first porous base body, adjacent to the fuel cell plate structures, in a direction in which the cell element layers are laminated.

2. A solid electrolyte fuel cell electric power generation unit, comprising:
   a solid electrolyte fuel cell stack having a solid electrolyte fuel cell plate structure and a first porous base body located adjacent to the solid electrolyte fuel cell stack having a solid electrolyte fuel cell plate structure; and
   a housing receiving the solid electrolyte fuel cell stack,
   wherein the solid electrolyte fuel cell plate structure includes:
   a cell element layer having an air electrode layer, a fuel electrode layer and a solid electrolyte layer which is sandwiched between the air electrode layer and the fuel electrode layer;
   a second porous base body supporting the cell element layer, the cell element layer being formed on the second porous base body such that the air electrode layer or the fuel electrode layer is formed on the second porous base body to be joined thereto; and
   a unitary gas-impermeable member having an electrical conductivity and being a foil folded or bent to be joined to the solid electrolyte layer to hermetically seal corresponding one of the air electrode layer and the fuel electrode layer which is formed on the second porous base body, thereby allowing gas flowing through the second porous base body to be separated from gas flowing outside the second porous base body, wherein a plurality of the solid electrolyte fuel cell plate structures are stacked via the first porous base bodies, adjacent to the fuel cell plate structures, in a direction in which the cell element layers are laminated, and wherein pipe members are located to interconnect the second porous base body of the solid electrolyte fuel cell plate structure to outside of the housing.

3. The solid electrolyte fuel cell stack of claim 1, wherein the gas-impermeable member is further joined to the second porous base body to hermetically seal the corresponding one of the air electrode layer and the fuel electrode layer.

4. The solid electrolyte fuel cell stack of claim 3, where the gas-impermeable member, solid electrolyte layer and the second porous base body are arranged to thereby allow gas flowing through the second porous base body to be separate from gas flowing outside and opposite to the second porous base body with respect to the gas-impermeable member.

5. The solid electrolyte fuel cell electric power generation unit of claim 2, wherein the gas-impermeable member is further joined to the second porous base body to hermetically seal the corresponding one of the air electrode layer and the fuel electrode layer.

6. The solid electrolyte fuel cell electric power generation unit of claim 5, where the gas-impermeable member, solid electrolyte layer and the second porous base body are arranged to thereby allow gas flowing through the second porous base body to be separate from gas flowing outside and opposite to the second porous base body with respect to the gas-impermeable member.

* * * * *